(12) United States Patent
Hakan et al.

(10) Patent No.: US 6,284,967 B1
(45) Date of Patent: Sep. 4, 2001

(54) SOLAR GENERATOR WITH FOLDABLE PANELS ESPECIALLY FOR A SPACECRAFT

(75) Inventors: Alo Hakan, Germering; Frank Seifert, Bruckmuehl, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/453,672

(22) Filed: Dec. 3, 1999

(30) Foreign Application Priority Data

Dec. 4, 1998 (DE) .............................. 198 55 993

(51) Int. Cl.⁷ .................................................. H01L 25/00
(52) U.S. Cl. ............................................ 136/245; 136/292
(58) Field of Search ...................................... 136/245, 292

(56) References Cited

U.S. PATENT DOCUMENTS

| 4,293,731 | 10/1981 | Schweig et al. | 136/245 |
| 4,988,060 | 1/1991 | Janson et al. | 244/173 |

FOREIGN PATENT DOCUMENTS

| 19713363 | 10/1998 | (DE) . |
| 0754625 | 1/1997 | (EP) . |

OTHER PUBLICATIONS

"Requirements for Solar Arrays Spurring New Techniques", by G.S. Hunter. Aviation Week + Space Technology; Aug. 14, 1967, pp. 72 to 88.

"New Technologic Methods for Solar Cell Devices", by Suppa et al., "Raumfahrtforschung" (Space Travel Research), vol. 5, 1969, pp. 205 to 212.

*Primary Examiner*—Mark Chapman
(74) *Attorney, Agent, or Firm*—W. F. Fasse; W. G. Fasse

(57) ABSTRACT

A solar generator especially for a spacecraft or space flight body has a plurality of first collector panels hinged to each other in a column extending in a first direction (D1) when the first collector panels are unfolded and a plurality of second panels coupled to the first panels so that the second panels can be unfolded in a second direction (D2) only after the first panels have been unfolded. The second panels are coupled to the first panels by journal struts or by hinges so that at least one first panel forms with at least one second panel, preferably with two or more second panels, a panel packet. The hinges (40) that articulate the first panels to each other permit unfolding the panel packets in said first direction (D1), whereupon the second panels in the individual packets can be unfolded in the second direction (D2).

15 Claims, 5 Drawing Sheets

SOLAR GENERATOR WITH FOLDABLE PANELS ESPECIALLY FOR A SPACECRAFT

PRIORITY CLAIM

This application is based on and claims the priority under 35 U.S.C. §119 of German Patent Application 198 55 993.3, filed on Dec. 4, 1998 the entire disclosure of which is incorporated herein by reference.

FIELD OF THE INVENTION

The invention relates to a solar generator, particularly for spacecraft. The solar generator or collector comprises panels that are stowed as a packet for transport and unfolded for deployment.

BACKGROUND INFORMATION

Solar generators or collectors are commonly used as power supplies for spacecraft such as telecommunication satellites. The terms "generator" and "collector" are used interchangeably herein. Solar collectors have panels that are initially folded for stowing the collector while transporting the satellite into an earth orbit. The panels are unfolded into an open state for deployment when the orbit has been reached. During the transport phase the collector shall need as little space as possible. On the other hand, the deployed surface area shall be as large as possible for transforming solar energy into electrical energy. Moreover, the deployment of the collector must be possibly free of trouble in order not to imperil the satellite's mission. Thus, a high degree of reliability particularly in the unfolding of the solar collector is necessary. Moreover, in order to test the kinematic and dynamic characteristics of the collector panels during an unfolding operation it must be possible to simulate such unfolding under gravity conditions on earth. Such testing must be possible with a minimum effort and expense.

Conventional solar generators of this type have a number of panels articulated to one another and foldable as well as unfoldable in a particular direction similar to the movement of the pleats of a bellows. The total deployed surface area of such solar collectors is limited by the acceptable maximal longitudinal extension of the panels away from the body of the satellite.

U.S. Pat. No. 4,988,060 (Janson et al.) discloses a solar collector with a plurality of panels interconnected to form panel wings which are symmetrically secured to a spacecraft. Hinges are arranged in alternate fashion along ridges of the individual panels sections so that the sections can be pulled out in the manner of pleats and folded back together into a package.

U.S. Pat. No. 4,293,731 (Schweig et al.) discloses a solar collector of lightweight construction including foldable panels. Journal pins passing through a journal loop and through a forked coupling provide hinges for the folding and unfolding.

European Patent Publication EP 0,754,625 A1 discloses a solar generator in which a first group of panels is foldable and unfoldable in one direction while further panels are foldable and unfoldable in a second direction. Such a structure increases the deployed surface area of the collector. The individual panels of the first group are connected by hinges and the panels of the second group are hinged to the first panel so that they can be flapped open. However, flapping open the panels of the second group causes relatively large disturbing moments that adversely affect the flight of the spacecraft. Another drawback is the fact that testing such generators with flap open motions under earth gravity conditions require a substantial effort and expense.

German Patent Publication DE 197 13 363 A1 discloses a method for increasing a surface area by first stacking surface elements that are partly interconnected by flap hinges and then unfolding the elements in the manner of a paper folding operation.

Aviation Week+Space Technology; Aug. 14, 1967, pages 72 to 88, describes in an article "Requirements for Solar Arrays Spurring New Techniques" various roll-up solar cell arrays.

Roll-up techniques can provide relatively large surface area panels when deployed. However, deployment can be problematic.

"Raumfahrtforschung" (Space Travel Research), Vol. 5, 1969, pages 205 to 212, describes in an article "New Technologic Methods for Solar Cell Devices" various requirements that must be met by solar collectors suitable for space travel. Advanced panel fabrication methods are disclosed that permit welding panel components and avoid using adhesives. Roll-out and fold-out collectors are described.

OBJECTS OF THE INVENTION

In view of the foregoing it is the aim of the invention to achieve the following objects singly or in combination:

- to avoid drawbacks of conventional solar collectors, more specifically to provide folding and unfolding features that will avoid or at least substantially reduce imposing of disturbing moments onto the spacecraft to which the collector is mounted;
- to combine rotational folding movements of individual first panels relative to each other with compound movements including lateral, linear motion components of second panels to avoid generating undesirable torque moments;
- to optimize the available collector surface area in its deployed state relative to the collector's weight;
- to assure a reliable deployment of the collector panels and their retraction into an inactive state under all operating conditions; and
- to facilitate the testing of folding solar collectors under earth gravity conditions.

SUMMARY OF THE INVENTION

A solar generator according to the invention comprises the following features in combination. A plurality of first solar collector panels are articulated to one another for folding and unfolding said first collector panels in a rotating motion in a first direction (D1). At least one second collector panel is journaled by couplers to one first collector panel, whereby the couplers enable said at least one second collector panel to follow a compound motion including a lateral linear motion component extending in a second direction (D2) for laterally shifting said at least one second collector panel when said at least one second panel is unfolded or folded.

Preferably, the first and second motion directions extend perpendicularly to one another so that the at least one second panel, due to its coupling to one first panel, can follow a lateral linear motion component perpendicularly to said first direction when said at least one second panel is folded or unfolded in said second direction. Preferably, the unfolding of the second panels can take place only after the first panels or panel packets have been unfolded in the first direction.

An important advantage of the solar generator according to the invention is its ability to have a substantially larger collector surface area without increasing the collector length away from the spacecraft compared to conventional collectors. Further, the folding and unfolding of the present solar collector panels does not exert on the spacecraft torque moments that could have an adverse influence on the spacecraft or space flight body. Still another advantage is seen in that the foldability of the present collector panels is highly reliable because simple articulation hinges and coupling journal elements are employed. It is unexpected that the combination of two motion directions for the folding and unfolding of the panels is as reliable as the folding and unfolding of a conventional panel combination that permits folding and unfolding in only one direction. Moreover, the present folding operations can be tested on the ground under gravity conditions with little effort and expense.

According to the invention the first panels or packets of first and second panels are articulated to one another by hinges permitting the deployment out of a folded, stacked condition into an open operative position by first pulling the first panels or packets apart in the manner of bellows pleats and then shifting the second panels laterally out of the packets.

According to one embodiment of the invention (FIGS. 1 and 2) first panels are sandwiched between second panels in the stacked condition to form packets (FIG. 2A) each including at least one first panel and at least two second panels. In a second embodiment (FIGS. 3 and 4) the packets contain two panels with a first panel positioned on top of a second panel, whereby a stack formed of such packets comprises a second panel at the bottom and a first panel at the top of the stack with first and second panels stacked therebetween (FIG. 3A). In a third embodiment (FIGS. 5 and 6), a first panel is stacked between two second panels to form a packet, whereby the packets are stacked so that two second panels will be positioned between first panels in the stack as in the first embodiment, however with different coupling elements.

In all embodiments, the hinges which connect the first panels to each other extend alongside neighboring packets for unfolding the packets in the manner of a bellows in the first direction and then shifting the second panels relative to the first panels in the lateral second direction.

According to a preferred embodiment of the invention two second panels are coupled to each other by tiltable journal struts which in turn are journaled to one first panel positioned between two second panels, whereby the second panels are unfoldable in the second direction with a linear motion component from the stacked position into the opened position and vice versa after the first panels have been unfolded in the first direction.

It is practical if journal boxes at the ends of the journal struts are each spaced from a central journal box on the respective strut by an on-center spacing corresponding to one half of the panel width (W) in the second direction D2. Long tiltable journal struts have a length corresponding to the panel width (W) and are journaled to the sides of the first panel where a central panel axis passes through the first panel perpendicularly to the panel width direction. The ends of the struts are journaled to one end of each of the two second panels forming with the first panel a panel packet. The long struts are preferably arranged as seesaw levers, the center journal of which is secured to the above mentioned central panel axis at an edge of the respective first panel while the strut ends are journaled to respective panels ends of second panels.

In a further embodiment short struts are journaled to the end of one second panel and to the center along the edge of one first panel. In this further embodiment the struts have a length approximately corresponding to one half of the panel width (W).

The just mentioned journals for tiltably securing the struts to the panels may comprise bushings in which a journal pin is received. The bushings may be part of the struts or of the panels. Similarly, the pins may be part of the panels or the struts.

In the third embodiment the struts are avoided and the panels are hinged to each other to form packets each including at least one first panel and at least one, preferably two, second panels. The first panels are hinged to each other, whereby the packets are hinged to each other for first unfolding the packets in the first direction and then unfolding or shifting the second panels in the second direction out of the packet, preferably perpendicularly to the first direction. In this embodiment in which first and second panels are hinged (at 70) directly to each other, the unfolding out of the stacked condition takes place by tilting the second panels about the journal joints while simultaneously rotating the first panel of a packet about its central axis.

Advantageously for an optimal surface area two to six, preferably four first panels, are hinged to each other for unfolding in the first direction. One or two second panels are each coupled with one first panel. However, for a lateral deployment of the second panels one first panel preferably carries at least one second panel on each of two opposite sides.

According to the invention the second panels are unfoldable only after a complete unfolding of the first panels. Accordingly, the packets of first and second panels must first be unfolded before the individual second panels can be unfolded laterally out of a panel packet. For this purpose it is preferred that the hinges articulating the first panel in a packet with the first panel in the next packet in a stack, comprise interlocking elements which release the second panels for an unfolding only after the first panels or packets have been unfolded. Such interlocking elements may, for example, cooperate with the tiltable journal struts to prevent their tilting until the first panels have been unfolded. Cable pulls are preferably connected to the first and/or second panels for unfolding the panels in a controlled motion sequence.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 7A:
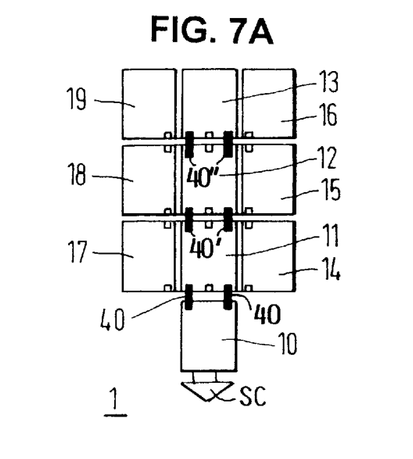
FIG. 7A shows a plan view of ten panels fully unfolded according to the first embodiment of FIGS. 1A to 2C.

FIGS. 1A, 1B, 2A, 2B, 2C, 7A and 7B illustrate a first embodiment which will now be described. A solar generator 1 according to the first embodiment of the invention has, for example, a total of ten panels as shown in FIG. 7A. Collector panels 10, 11, 12 and 13 are referred to as first panels. The first panel 10 is conventionally mounted to a spacecraft SC symbolically shown as a triangle. Additionally, the first panel 10 is articulated to the next first panel 11 by hinges 40 as shown in FIG. 7A. The first panels 11 and 12 are articulated to each other by hinges 40' shown in more detail in FIGS. 8A, 8B. The first panels 12 and 13 are articulated to each other by hinges 40". The hinges 40, 40', 40" permit a bellows or pleat folding or unfolding of the first panels in a first direction D1. The first panels form in the unfolded condition a row or column in the direction D1. Second panels 14, 15, 16, 17 and 19 are coupled in pairs by journal struts 50, 50' best seen in FIGS. 1B, 2A, 2B and 2C to one first panel 11 or 12 or 13 to form three panel packets. FIG. 7A shows the panels 10 to 19 are in their deployed state. The second panels 14 to 19 are unfoldable with a lateral linear shifting motion component in a second direction D2 shown in FIG. 2B and extending preferably perpendicularly to the first direction D1. The journal struts 50, 50' enable the second panels, after the first panels have been unfolded, to perform or follow a compound motion including the lateral motion component in a second direction D2 which preferably extends perpendicularly to said first direction D1.

Figure 1A:
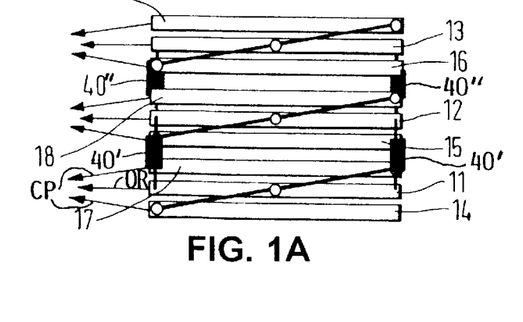
FIG. 1A shows a side view of three panel packets forming a stack, wherein each panel packet has three panels articulated to each other by two long journal struts.
Figure 2A:
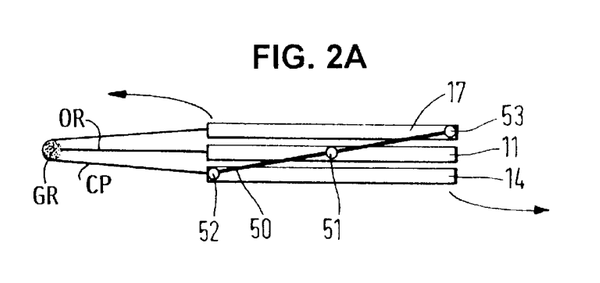
FIG. 2A shows the bottom panel packet of FIG. 1A, including a first panel positioned between two second panels.
Figure 2B:
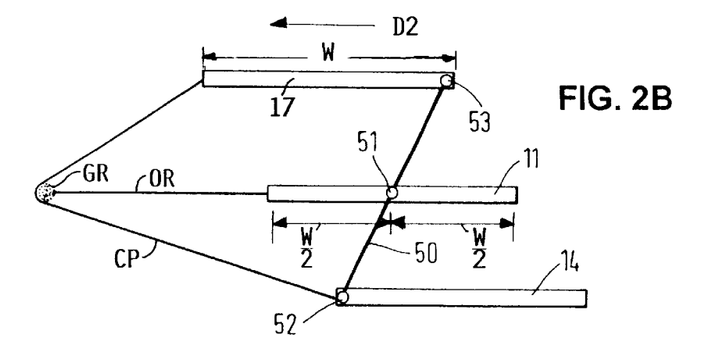
FIG. 2B shows the panel packet of FIG. 2A partially unfolded with the aid of a cable pull.
Figure 2C:
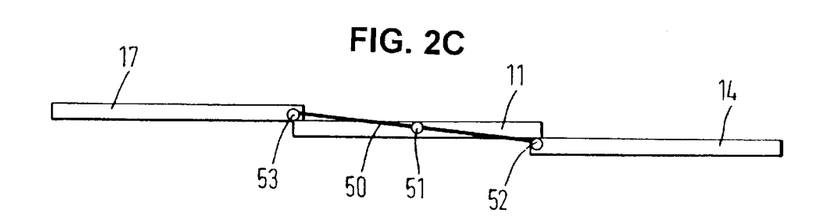
FIG. 2C shows the panel packet of FIG. 2A fully unfolded with the three panels of the packet deployed substantially in the same plane.
Figure 3A:
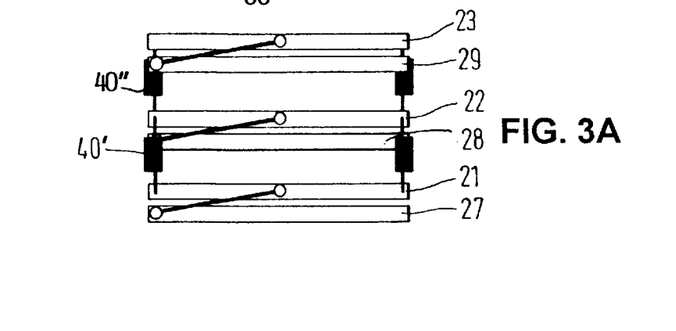
FIG. 3A shows a side view similar to that of FIG. 1A, however, each panel packet comprises only one first panel and one second panel so that the respective stack has six panels, wherein the two panels forming a packet are journaled to each other by two short journal struts.

FIGS. 2A, 2B and 2C show a first panel 11 coupled to two second panels 14 and 17 by two journal struts 50, 50' and six journal joints. One journal strut 50 and three journal joints 51, 52 and 53 face the viewer. The other struts and joints are positioned symmetrically behind the visible strut 50 and joints 51, 52, 53. The respective panel packet of the one first panel between two second panels is shown in FIG. 2A. FIG. 2B illustrates a cable pull CP connected with its end to an edge of the second panels 14 and 17 and running over a guide roller GR secured to an outrigger arm OR rigidly secured to the first panel 11 sandwiched between the two second panels 14 and 17. For example, three such panel packets form a panel stack shown in FIG. 1A.

Figure 1B:
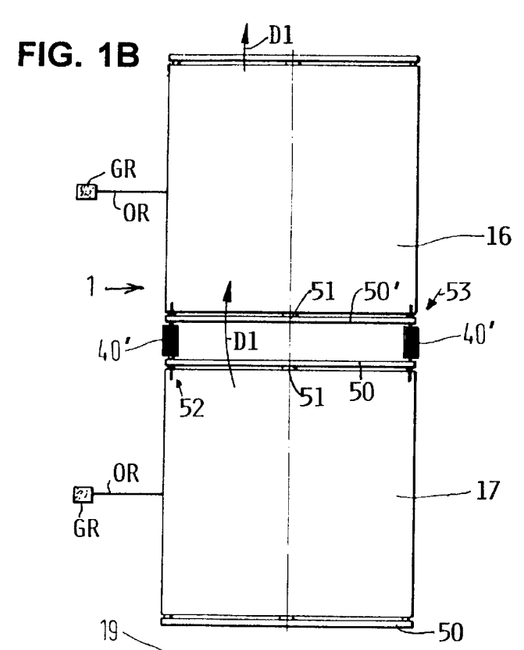
FIG. 1B shows the stack of FIG. 1A partially unfolded in a first direction (D1)

The first or lowermost packet in FIG. 1A includes the first panel 11 sandwiched between two second panels 14 and 17. The panel 10, not shown in FIG. 1A, is hinged or articulated to the panel 11 as mentioned above by hinges 40 and shown symbolically in FIG. 7A. The first packet is hinged to the second packet by hinges 40' constructed the same as the hinges 40. Similarly, the second packet is hinged to the third packet by hinges 40" also of the same construction. These hinges 40, 40', 40" bridge the gap between neighboring packets in the stack and also the neighboring second panels positioned in the gap. For example, the hinges 40' provided as a pair bridge the second panels 15 and 17. Similarly, the pair of hinges 40" bridges the panels 16 and 18. This arrangement permits unfolding the packets in the first direction D1 shown in FIG. 1B. In FIG. 1B the first packet with panels 14, 11 and 17 is folded flat so that the top surface of the panel 17 faces the viewer. The second packet with the panels 15, 12 and 18 stands upright and is directed toward the viewer. The third packet with the panels 16, 13 and 19 is folded flat so that a surface of the panel 16 faces the viewer. As the unfolding in the direction D1 proceeds, the middle packet will be flattened out in the manner of the pleats of a bellows. Each of these folding steps in the direction D1 involves a folding by about 180°. Once the just described unfolding of the first panels 10 to 13 is completed, the lateral compound motion of the second panels as illustrated by the example of the second panels 14 and 17 in FIGS. 2A, 2B and 2C, takes place in the direction D2. In FIG. 2C all three panels 11, 14 and 17 assume a position substantially in the same plane, but not completely in the same plane as, for example shown in FIG. 6C. Thus, the term "substantially" in this context means the orientation shown in FIG. 2C and also in FIG. 4C with some overlap of panel edges.

Referring specifically to FIGS. 2A, 2B and 2C in conjunction, each of the panels has a width W in the direction D2 and the long coupling struts 50, 50' have a length corresponding substantially to the width W. The coupling strut 50' is seen in FIG. 1B. Panel 14 has a journal joint 52 at one end secured to one end of the journal strut 50. Panel 11 has a journal joint 51 connecting the center of one edge of the panel 11 to the journal strut 50. The journal joint 51 is positioned at the center of the panel edge at one half of its width W. The panel 17 has a journal joint 53 coupling the other end of the strut 50 to the panel 17 at an end opposite to the end of the panel 14 carrying the journal joint 52. This arrangement makes the strut 50 a seesaw or double armed lever. When the strut 50 is turned counterclockwise by the cable pull CP, the panels 14 and 17 assume the unfolded positions shown in FIG. 2C relative to the panel 11. Counterclockwise rotation brings the panels back into the position of FIG. 2A showing a panel packet.

Figure 3B:
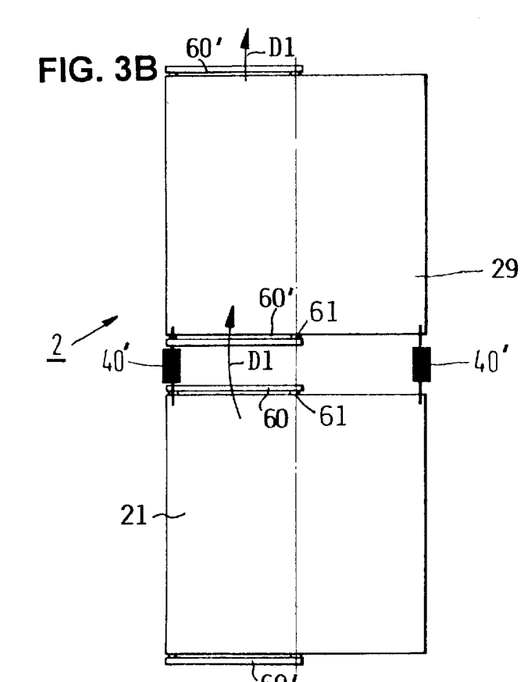
FIG. 3B shows the stack of FIG. 3A partially unfolded in the first direction (D1)
Figure 4A:
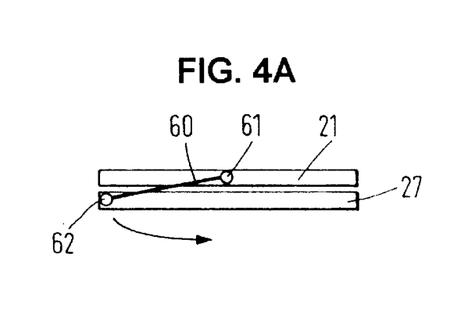
FIG. 4A shows the bottom first panel packet of FIG. 3A including one first panel on top of one second panel.

A second embodiment will now be described with reference to FIGS. 3A, 3B, 4A, 4B, 4C, 7C and 7D. In this embodiment each packet of the solar collector 2 comprises two panels as best seen in FIG. 4A. Panels 20, 21, 22 and 23 are referred to as first panels which are hinged to each other by the hinges 40' and 42" as described above with reference to the first example embodiment. Accordingly, the first panels can be unfolded in the manner of pleats of a bellows in the first direction D1. Second panels 27, 28 and 29 are coupled to the first panels only along one side thereof as shown in FIG. 7C. In another arrangement of second panels, the second panels 25, 27 and 29 are coupled to the first panels as shown in FIG. 7D showing the panel 25 on one side of the first panels and staggered relative to the second panels 27, 29 on the other side of the first panels. Here again, the first panels are foldable and unfoldable in the direction D1 while the second panels are laterally shiftable with the help of their couplings in the direction D2 extending preferably at right angles to the first direction D1. Motions in the second direction D2 take place only after unfolding in the first direction is completed.

Figure 4B:
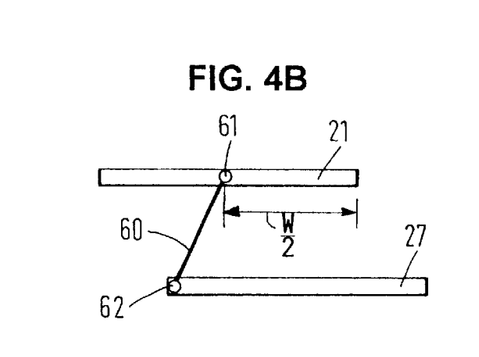
FIG. 4B shows the panel packet of FIG. 4A partially unfolded, whereby a cable pull is not shown.
Figure 4C:
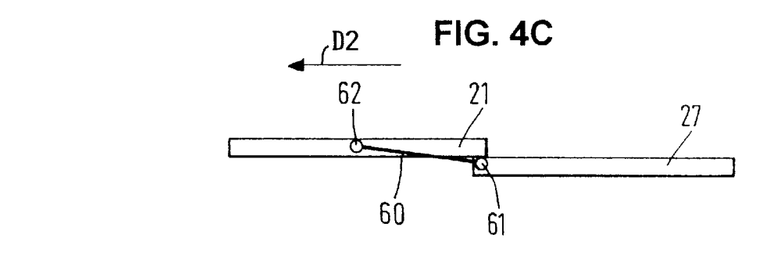
FIG. 4C shows the panel packet of FIG. 4A fully unfolded with the two panels deployed substantially in the same plane.

Referring to FIG. 4A, a first panel 21 is coupled to a second panel 27 by short journal struts 60, 60' connected by a journal 61 to the center of the edge of the panel 21 and by a journal 62 to the end of the panel 27. One short strut 60' seen in FIG. 3B is positioned behind the strut 60. The length of the struts 60, 60' corresponds substantially to one half of the panel width W. FIG. 4B illustrates the movement of the strut 60, 60' counterclockwise to bring the panels 21 and 27 into the position shown in FIG. 4C. FIG. 3A shows three panel packets one of which is illustrated in FIG. 4A. The panel packets form a stack in which the second panel 28 is positioned between first panels 21 and 22. Second panel 29 is positioned between first panels 22 and 23. First panel 21 is positioned between second panels 27 and 28. The unfolding in the direction D1 is the same as in the first example embodiment. As shown in FIG. 3B, the central packet with the panels 28 and 22 is still in an upright not yet unfolded position facing the viewer, whereas the lower packet with the panels 21 and 27 and the upper packet with panels 23 and 29 are already unfolded. This folding involves a turning movement of about 180° in the direction D1. When the unfolding of the first panels is completed, the second panels 27 to 29 are unfolded as illustrated in FIGS. 4A, 4B and 4C in the direction D2. By tilting the coupling struts 60, 60' counterclockwise about the journal 61 by somewhat less than 180°, the panel 27 moves from the position of FIG. 4A into the position of FIG. 4C and is unfolded. The journal 61 at the center in the sides of the panel 21 and of the other first panels is spaced from the lateral edges by half the width W. Thus, this tilting brings the two panels substantially into the same plane, whereby again the term "substantially" has the above meaning with regard to FIG. 2C. In the embodiment using journal struts 50, 50' or 60, 60' a small overlap of panel edges as shown in FIGS. 2C and 4C is preferred to prevent jamming.

A third solar collector 3 will be described with reference to FIGS. 5A, 5B, 6A, 6B, 6C, 7E and 7F. Incidentally, in this third embodiment an edge overlap of the panels is not needed because the hinges 70 prevent jamming so that the first and second panels can be unfolded into the same plane.

Figure 6A:
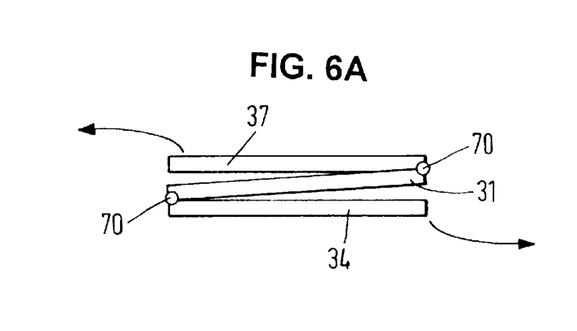
FIG. 6A shows the bottom panel packet of FIG. 5A including a first panel positioned between two second panels.
Figure 6B:
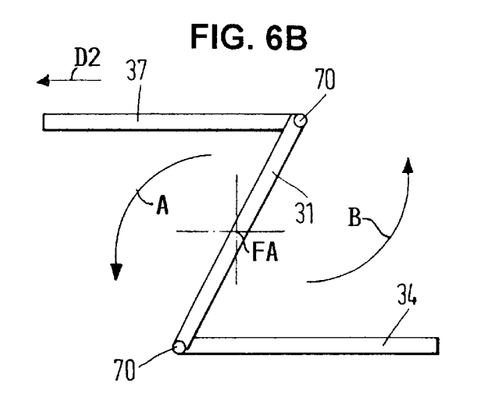
FIG. 6B shows the panel packet of FIG. 6A partially unfolded, whereby a cable pull is not shown.
Figure 6C:
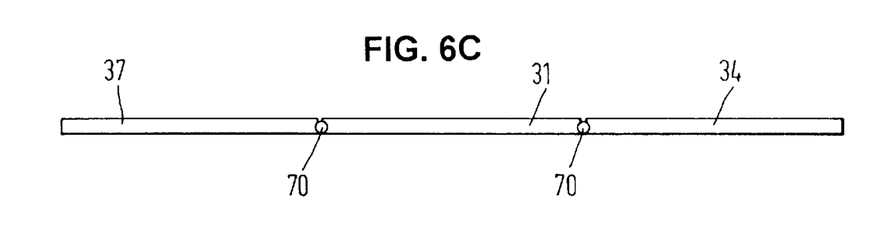
FIG. 6C shows the panel packet of FIG. 6A fully unfolded with the three panels deployed in the same plane.

The journal struts of the first two embodiments have been replaced in the third embodiment by hinges 70 directly articulating second panels 34, 37 to a first panel 31 as best seen in FIGS. 6A, 6B and 6C. The first panel 31 is journaled to a fixed central axis FA coinciding with its central cross-axis extending perpendicularly to the width W of the respective first panel. By rotating the first panel 31 counterclockwise as indicated by the arrows A and B, the panels are unfolded from the position of FIG. 6A into the position of 6C where all the panels of a packet 31, 34, 37 are oriented in the same plane as mentioned above.

Figure 5A:
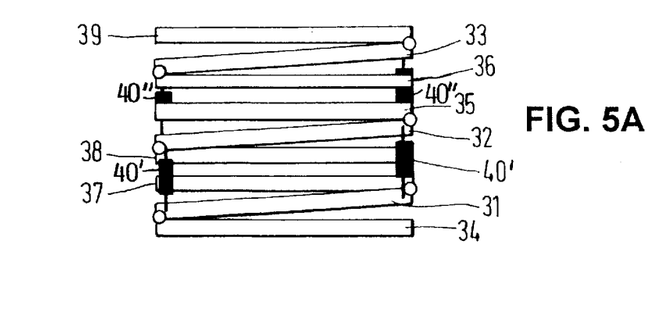
FIG. 5A shows a side view similar to FIG. 1A of a stack with three panel packets, wherein each packet comprises three panels hinged to each other without any journal struts.
Figure 5B:
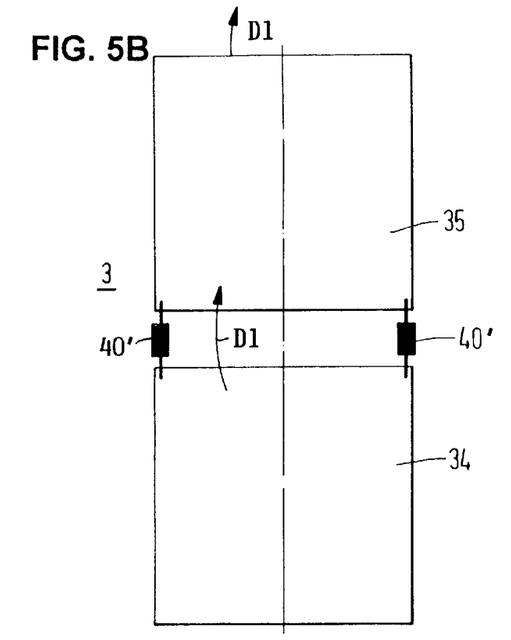
FIG. 5B shows the stack of FIG. 5A partially unfolded in the first direction (D1)

FIG. 5A shows a stack of a total of three panels packets, each packet containing a first panel between two second panels. The bottom most packet includes second panels 34 and 37 with a first panel 31 disposed between these second panels. The first packet is hinged to the second packet by hinges 40'. The second packet contains a first panel 32 between second panels 38 and 35. The second packet is hinged to the top most packet by hinges 40" and the top most packet comprises the first panel 33 between second unfolded panels 36 and 39. The unfolded arrangement of the panels is substantially the same as in the first embodiment, please see FIGS. 7E and 7F with the exception that the unfolding of the panel packets in the direction D2 is now accomplished by rotating the intermediate first panel as indicated by the arrows A and B rather than by rotating the journal shafts. Folding of the panel packets in the direction opposite the direction D2 takes place by clockwise rotating the intermediate first panel 31 about the fixed axis FA. The fully unfolding or fully folding requires a rotation of about 180°. In any event, the packets must first be unfolded in the direction D1 with the help of the hinges 40, 41' and 40" before the unfolding in the direction D2 can take place. Similarly, the folding of the solar collector requires performing the folding in the direction opposite to the arrow D2 first. Thereafter, the hinges 40, 40' are operated to stack the packets as shown in FIG. 5A.

Figure 7B:
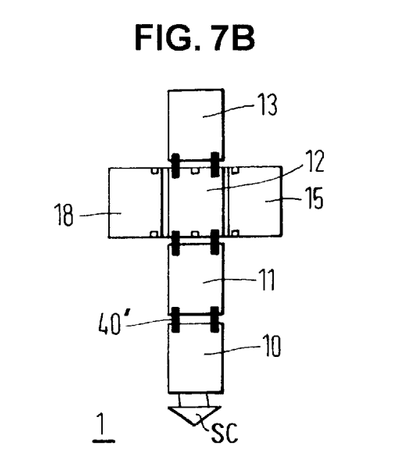
FIG. 7B shows a plan view as in FIG. 7A, however, only with six panels.
Figure 7C:
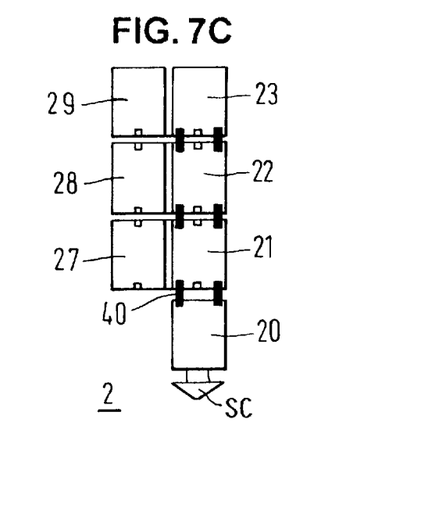
FIG. 7C shows a plan view of seven panels fully unfolded according to the second embodiment of FIGS. 3A to 4C.
Figure 7D:
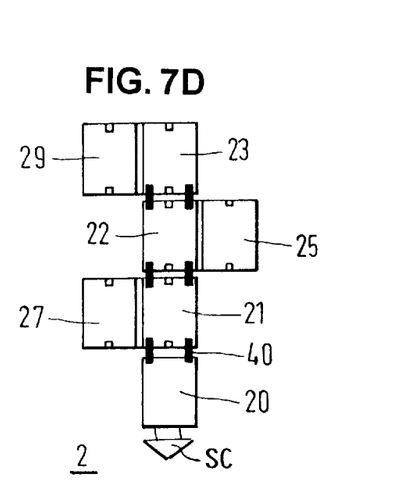
FIG. 7D shows seven fully unfolded panels according to the second embodiment as in FIG. 7C, however with a different positioning of the second panels relative to the first panels.
Figure 7E:
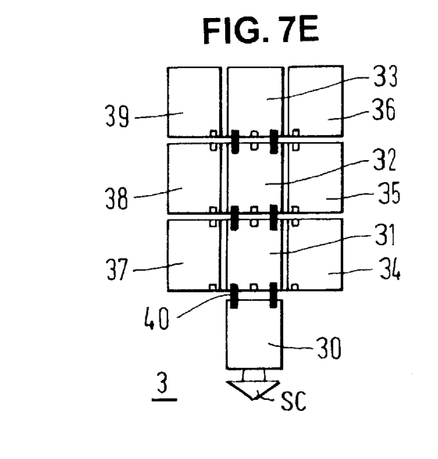
FIG. 7E is a view similar to that of FIG. 7A, however illustrating ten fully unfolded panels that are hinged and coupled as in the third embodiment of FIGS. 5A to 6C.
Figure 7F:
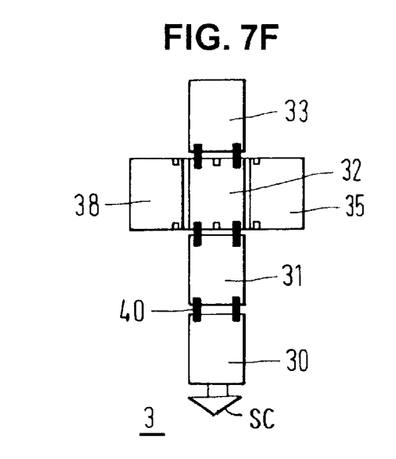
FIG. 7F is a plan view of six panels as in FIG. 7B, however, hinged and coupled according to the third embodiment of FIGS. 5A to 6C.

Referring to FIGS. 7A to 7F, the combination of first panels with second panels may assume different configurations. FIGS. 7A and 7E show a combination of ten panels with second panels arranged along both sides of the column of first panels except not along panels 10 and 30. FIGS. 7B and 7F show combinations of six panels with four first panels and two second panels forming a cross-configuration. The second panels can be positioned anywhere along the sides of the first panels, for example as shown in FIGS. 7C and 7D illustrating two different combinations of seven panels. Panels 10, 20 and 30 are only connected to the spacecraft SC and, as shown, do not carry any second panels merely for mounting convenience. However, even these panels 10, 20 and 30 may carry one or two second panels if desired. Thus, the present arrangement of panels provides a substantial flexibility in selecting the number and positions of second panels relative to the column of first panels.

In order to assure that the second panels can only be unfolded after the first panels have been unfolded, it is suggested that the hinges 40, 40', 40" are provided with locking elements that prevent a folding motion of the second panels until the first panels are fully unfolded to form the column. In a preferred embodiment locking elements forming part of the hinges 40, 40', 40" prevent an unfolding of the journal struts 50 and 60 until the first panels are fully unfolded. Spring biased locking pins or locking balls may be used for engaging for example the journal struts 50, 60 or the hinges 70.

Figure 8A:
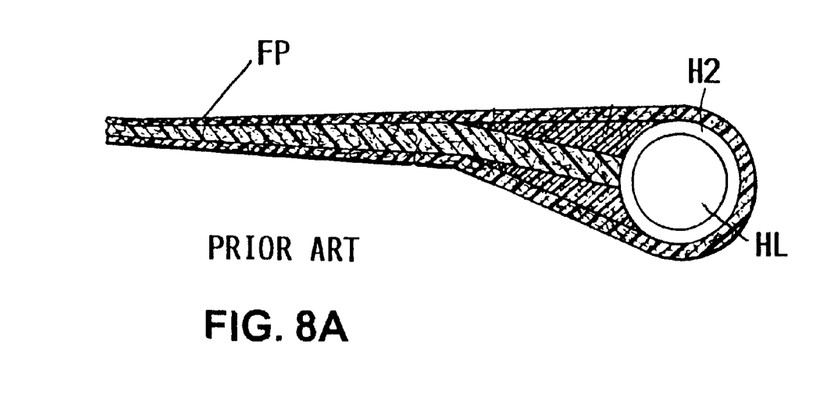
FIGS. 8A and 8B show conventional hinge elements suitable for coupling first panels or panel packets to each other.
Figure 8B:
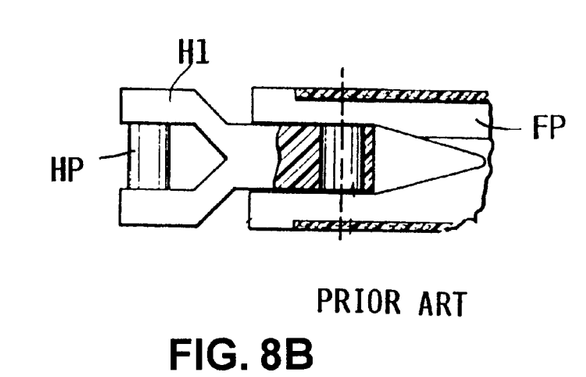

The cable pulls CP shown schematically in connection with the first embodiment may also be used in the second and third embodiments. Such cable pulls are conventional FIGS. 8A and 8B show conventional hinge elements H1 and H2 that could be used according to the invention for example as the hinges 40, 40', 40". The hinge elements H1, H2 are secured to the first panels FP. A hinge pin HP of the hinge element H1 fits into a hinge loop HL of the other hinge element H2. Please note the illustration is not to scale, FIG. 8 is shown on a larger scale than FIG. 8B. The hinges are long enough to accommodate the height of the panel packets that are hinged together according to the invention for folding and unfolding in the first direction D1.

Figure 9:
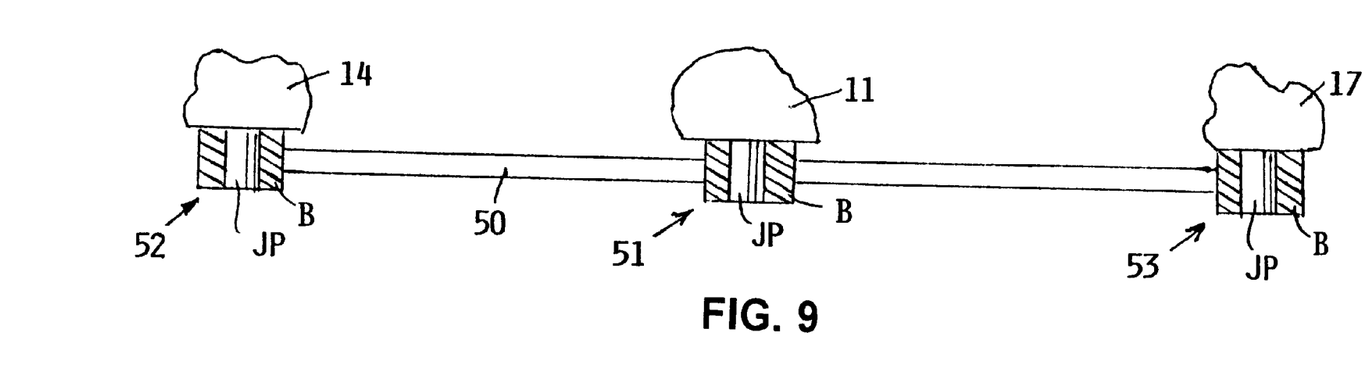
FIG. 9 shows details of a long coupling strut with its journals for articulation to the respective panels for forming a panel packet.

FIG. 9 shows the long journal strut 50 with its journals 51, 52, 53 on an enlarged scale compared to FIG. 2B. Each journal 51, 52, 53 has a bushing B in which a journal pin JP of the respective panel 11, 14, 17 is received. Only broken away portions of the panels 11, 14 and 17 are shown in FIG. 9. The short journal strut 60 of FIGS. 4A, 4B, 4C is of similar construction as the strut 50, however the journal strut 60 has only two bushings.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A solar generator comprising a plurality of first collector panels, articulating means (40) interconnecting said first collector panels to one another for folding and unfolding said first collector panels in a first direction (D1), at least one second collector panel, couplers (50, 60, 70) journaling said at least one second collector panel to one of said first collector panels, wherein said couplers enable said at least one second collector panel to follow a compound motion including a lateral linear motion component extending in a second direction (D2) for laterally shifting said at least one second collector panel when said at least one second collector panel is folded or unfolded.

2. The solar generator of claim 1, wherein said second direction (D2) extends perpendicularly to said first direction (D1) and unfolding of said second panels can take place only after said first panels have been unfolded.

3. The solar generator of claim 1, wherein said couplers comprise journal struts (50, 60) and journal joints (51, 52, 53; 61, 62) connecting said second collector panel or panels to said one first collector panel in such a way that said second panel or panels are foldable and unfoldable by tilting said journal struts, and wherein said second panel or panels are unfoldable only after said first panels have been unfolded.

4. The solar generator of claim 3, wherein said first and second panels have a width (W) in a direction perpendicular to said first direction, and wherein said journal joints are positioned on said journal struts at on-center spacings between neighboring journal joints corresponding to one half of said width (W), and wherein said journal struts have a length sufficiently corresponding to said width so that one journal joint at each strut end is connected to a panel end of each second panel.

5. The solar generator of claim 4, wherein each of said journal struts comprises three journal bushings (B) including one journal bushing at each strut end for connection to said panel end of said second panels and one journal bushing intermediate said strut ends connected to said one first panel, said second panels comprising a journal pin (JP) at each said panel end, said one first panel comprising a center journal pin extending from a center on panel edges between said panel ends of said one first panel, and wherein said journal pins (JP) are received in said journal bushings (B) to form said journal joints.

6. The solar generator of claim 5, wherein said journal strut is a seesaw lever or double ended lever journaled at its ends to said second panels and with its center to said center journal pin of said one first panel.

7. The solar generator of claim 1, wherein said coupler comprises hinges (70) journaling said second panels (34, 37) to said one first panel (31), whereby said first panel (31) is positioned between said second panels (34, 37), and wherein unfolding takes place by tilting said second panels (34, 37) about said hinges (70) while turning said first panel (31) about an axis (FA) extending perpendicularly to lateral edges of said one first panel (31) and in parallel to said first direction (D1).

8. The solar generator of claim 7, wherein said hinges (70) extend along opposite edges of said first panel, and wherein at least one of said second panels is hinged to each of said opposite edges of said first panel.

9. The solar generator of claim 1, wherein said articulating means comprise hinges (40, 40', 40") hinging said first panels to one another for unfolding said first panels as bellows pleats out of a stacked condition into an unfolded, deployed condition.

10. The solar generator of claim 9, wherein at least two of said second panels are sandwiched between said first panels in said stacked condition, and wherein said hinges (40) bridge a spacing between said first panels in which spacing said second panels are positioned.

11. The solar generator of claim 10, wherein said one first panel forms a panel packet with at least one of said second panels in said stacked condition, and wherein said hinges (40) connected to said first panels interconnect said panel packets forming a stack whereby the stack is unfoldable as said bellows pleats.

12. The solar generator of claim 1, comprising at least two of said first panels articulated to each other by said articulating means (40), whereby said first panels extend in said first direction (D1), and wherein said articulating means (40) have a hinging axis extending perpendicularly to said first direction (D1).

13. The solar generator of claim 1, wherein said articulating means (40) comprise stop elements for releasing the unfolding of said second panels by said coupler only after said first panels have been fully unfolded.

14. The solar generator of claim 13, wherein said stop elements engage said coupler means until said first panels have been fully unfolded.

15. The solar generator of claim 1, further comprising a cable pull (CP) interconnecting said first and second panels for controlling the motion of said panels from a folded condition into an unfolded condition and vice versa.

* * * * *